United States Patent
Deutsch

[15] 3,653,060
[45] Mar. 28, 1972

[54] SYSTEM AND COMPONENTS FOR GENERATING, STORING AND RECORDING VARIABLE DATA

[72] Inventor: Fritz A. Deutsch, Euclid, Ohio
[73] Assignee: Addressograph-Multigraph Corporation, Cleveland, Ohio
[22] Filed: Jan. 30, 1970
[21] Appl. No.: 7,049

[52] U.S. Cl. ..............346/43, 222/30, 235/94 R, 346/98
[51] Int. Cl. ...................................................B67d 5/24
[58] Field of Search.................346/43, 98, 104; 235/94 R, 235/94 U; 222/30

[56] References Cited

UNITED STATES PATENTS

| | | | |
|---|---|---|---|
| 3,083,641 | 4/1963 | Childs et al. | 101/269 |
| 3,426,943 | 2/1969 | Fitzgerald | 222/30 |
| 3,508,681 | 4/1970 | Fitzgerald | 222/30 |

Primary Examiner—Joseph W. Hartary
Attorney—Russell L. Root and Ray S. Pyle

[57] ABSTRACT

A system is provided which incorporates apparatus for sensing and generating as linear rod positions the amount registered on the indicia wheels of dispensing pumps, a date receiving and storing device adapted to be inserted into the pump for receiving and storing the data from the data generating device as linear positions of slide means, and a data recording device adapted to receive the data receiving and storing device and record the data retained by the receiving and storing device. The linearly positionable rods are coactable with stop means on the surface of the indicia wheels to provide a linear position corresponding to the data on the indicia wheels; the data receiving and storing device includes detented slide means adapted to sense the position of the linearly positionable rods on the generating device and retain said positions are corresponding positions of the slide means; the data recording device includes means to sense the position of the slide means on the data receiving and storing device and print characters corresponding to the position thereof. Preferably the data recording device is adapted to function either independently of or mounted on the pump and in conjunction with the operation of the data generating device.

16 Claims, 9 Drawing Figures

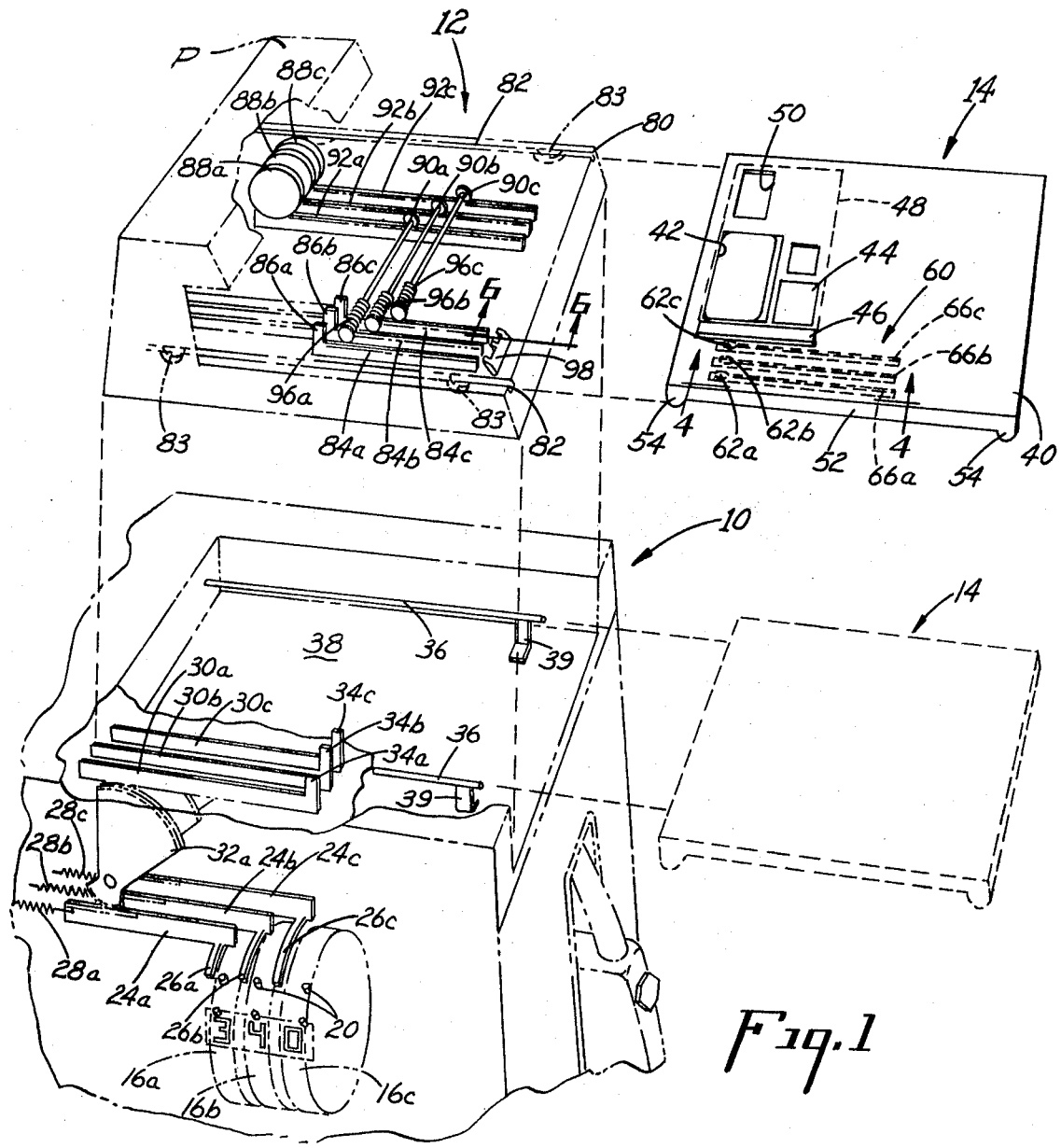
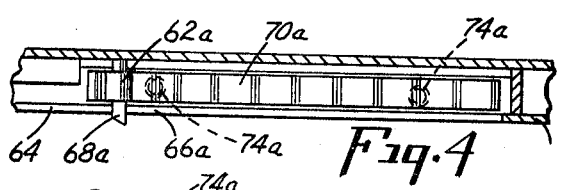
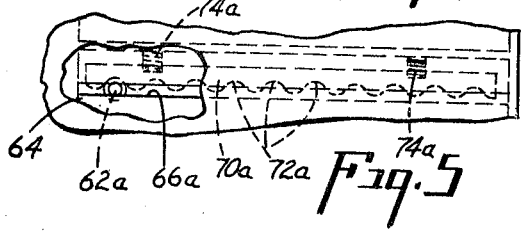
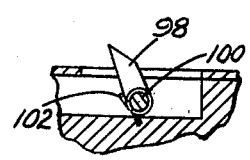

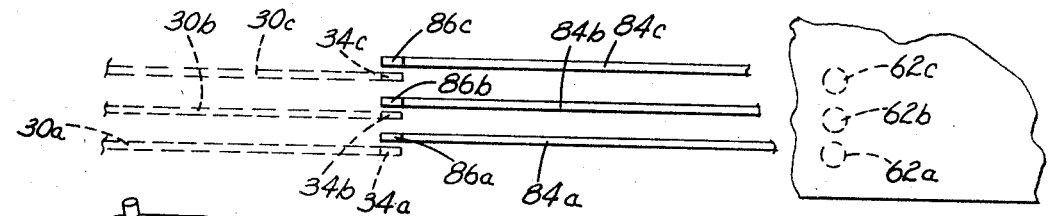
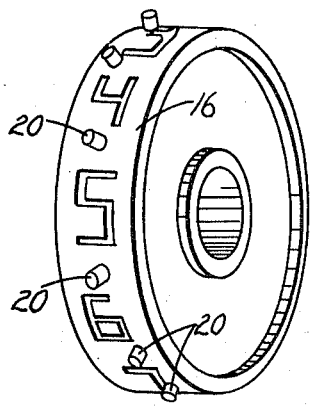
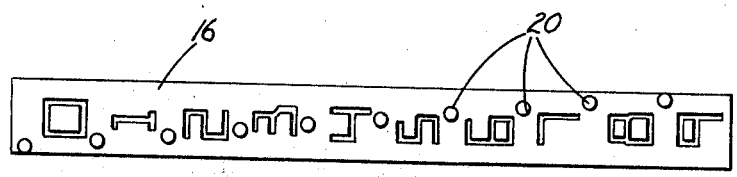
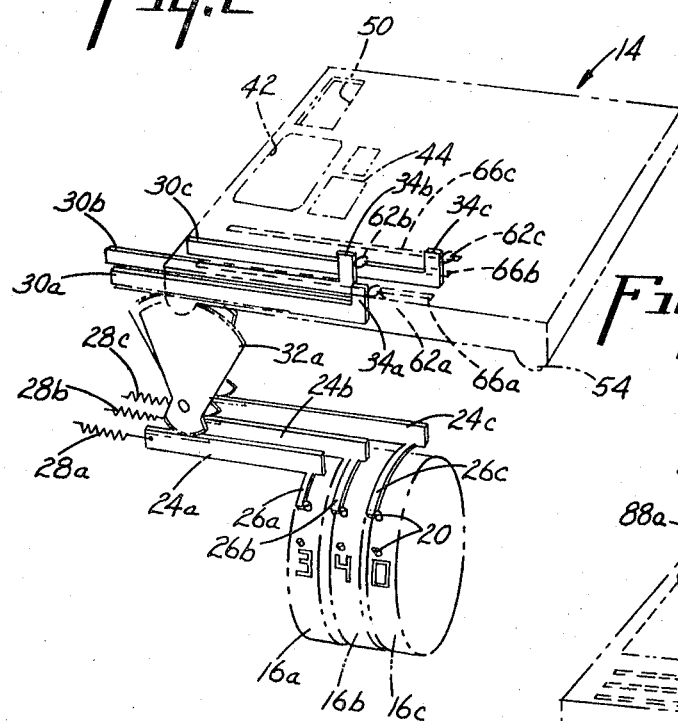
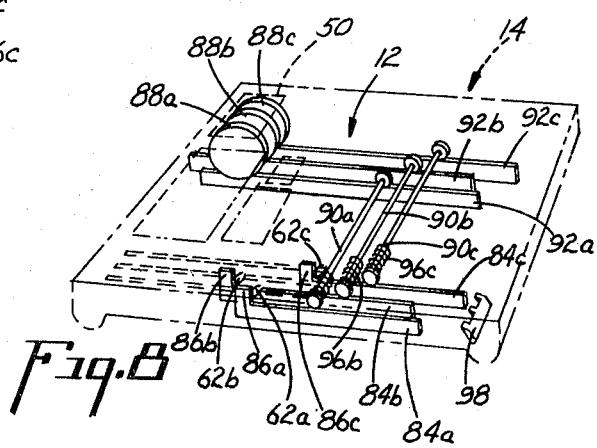

3,653,060

SYSTEM AND COMPONENTS FOR GENERATING, STORING AND RECORDING VARIABLE DATA

BACKGROUND OF THE INVENTION

This invention relates generally to systems for generating, storing and recording variable data, and more particularly to systems wherein variable data generated is recorded on a form together with other data carried on an embossed card. This invention in its present preferred form is specifically related to the sensing and recording on a form the variable data from gasoline pumps and information carried on a customer's credit card.

In the recording of credit card sales of gasoline, it has been conventional prior art practice for the attendant to read the amount from the pumps and manually enter this amount on a form. The amount is manually set on a set of printing wheels in a data recording machine. The credit card and form are then inserted into the recording machine, and a platen is actuated to record the amount of the sale and the information carried by the credit card on the form. The form and card are then removed from the machine, and the credit card is returned to the purchaser together with a copy of the form. The recording machine printing wheels remain at the established setting.

In this type of prior art operation, there is required a manual entry of the gasoline purchase onto the form, and further, there is required a manual entry of this amount into the recording machine. The manual entries of this nature are both time consuming and susceptible to error. Because of the time consuming nature of the operation, the efficiency of the gas station attendant is reduced. Also, because of the potential for error, there can be problems which can result in losses of money and customer good will.

There have been several prior art proposals for the automatic recording of data from gasoline pumps, either alone or in conjunction with recording of information from credit cards. Generally those systems rely on transmittal of the information from the gasoline pump mechanism directly to the recording mechanism, which is either mechanically or electrically attached to the gas pump.

Such systems have several serious drawbacks which have prevented their becoming widely accepted in the trade. First, it is quite expensive to provide each gasoline pump with an individual recorder. The cost of the recording devices is substantial, and this adds to the cost of the gasoline pumps. Also, the direct mechanical or electrical drive mechanisms proposed are often quite complex and susceptible to failure.

SUMMARY OF THE INVENTION

The present invention provides for a gasoline pump which will generate variable data, and which variable data can be sensed by a field board, and the sensed data in the field board automatically transmitted to the printing wheels of a recording machine for the recording of the variable data, together with any data on the credit card. The present invention also provides for the recording machine to be either separately positioned, in which case the data is stored in the field board and transferred to the recording machine, or optionally the recording machine can be mounted on the pump, in which case the generated data is transferred through the field board to the recording device while so mounted. The optional mounting of the recording device allows for the recorder to be mounted either on the pump or centrally mounted to receive the information from several data boards, depending upon the demand at any particular time in the station.

BRIEF DESCRIPTION OF THE DRAWINGS

FIG. 1 is a composite somewhat schematic showing of a gasoline pump, a data recorder, and a field board constructed according to this invention;

FIG. 2 is a perspective view of one of the indicia wheels of the gasoline pump for displaying the price of the gasoline delivered;

FIG. 3 is a developed view of the surface of the indicia wheel of FIG. 2;

FIG. 4 is a sectional view taken substantially along the plane designated by the line 4—4 in FIG. 1;

FIG. 5 is a plan view of a fragmentary portion of the field board partially in section with parts broken away for clarity;

FIG. 6 is a sectional view taken substantially along the plane designated by line 6—6 of FIG. 1;

FIG. 7 is a perspective view showing somewhat schematically the mechanism transferring the generated data of the gas pump to the field board;

FIG. 8 is a perspective view somewhat schematic showing the mechanisms transferring the data contained in the field board to the recording device; and FIG. 9 is a plan view showing the interrelationship of the actuating rods of the gasoline pump and operating rods of the field board when the recording device is mounted on the gasoline pump.

DESCRIPTION OF THE PREFERRED EMBODIMENT

Referring now to the drawings, FIG. 1 is a composite exploded view showing, with many parts schematically represented, a gasoline pump 10, a recording device 12, and a field board 14 which, together are adapted to generate, store, transmit and record on a form, the cost of gasoline delivered, together with information from embossed plates carried on the field board.

GASOLINE PUMP

The gasoline pump 10 has a pumping mechanism (not shown) which operates a register system having rotatable indicia wheels to display the total amount of purchase. These indicia wheels, which are shown and designated by reference characters 16a, 16b and 16c, are of conventional design but modified to allow the amounts shown on each of the wheels to be sensed. As can best be seen on page 2 of the drawings, FIGS. 2 and 3, in which one of the wheels is shown, modifications include a series of 10 pins 20 positioned on the surface on each of the indicia wheels, one corresponding to each of the numbers 0 to 9. The pins 20 are in progressively staggered relationship so that the pin representing each number is at a different axial location on the surface of the wheel. This will allow a sensing mechanism to sense their position and translate the position of the pins into a linear position of rods, the position of which in turn can be sensed by the field board and recorded by the recorder.

Referring again to FIG. 1, the sensing mechanism includes three sensing arms 24a, 24b and 24c adapted to cooperate respectively with the wheels 16a, 16b and 16c. Then sensing arms 24a, 24b and 24c have at the ends thereof sensing shoes 26a, 26b and 26c which are positioned to coact with the pins 20 on the wheels for determining an extended position.

The sensing arms are also provided with biasing springs 28a, 28b and 28c respectively which normally bias the levers into a given "home" position with the sensing shoes positioned at the edge of their respective wheels.

The sensing arms 24a, 24b and 24c are operatively connected to actuating rods 30a, 30b and 30c through quadrant gears, one of which is shown at 32a. The actuating rods 30a, 30b and 30c are each independently slidably mounted (by means not shown) for linear longitudinal movement, and have respectively upwardly extending engagement fingers 34a, 34b and 34c adapted to coact with a mechanism in the field board. The gasoline pump 10 also includes a pair of guide rods 36 normally disposed in a recess 38. The rods are retractable into the pump out of the recess 38 by a slidable mounting on the pump, and releasable fastening means designated as 39 are shown schematically.

FIELD BOARD

Referring to FIGS. 1, 4 and 5, the field board 14 includes a generally rectangular support member 40 having a planar upper surface which is provided with a credit card receiving recess 42, a station plate receiving recess 44, and a spring clip 46 which is adapted to engage and hold a form shown in dotted outline and designated as 48. The support member 40 also includes a through opening 50 through which printing wheels on the recorder can project to cause printing on the form. The form 48 overlies at least a portion of the credit card receiving recess 42, the station plate receiving recess 44, and the printing wheel opening 50.

The support member 40 also includes a pair of depending sides, one of which is shown at 52, each of which is provided with a pair of downwardly extending cams 54 to permit the insertion of the data board into the recorder 12 as will be described presently.

The field board 14 also includes a data receiving and storing mechanism designated generally as 60. This mechanism 60 includes three slidably positionable lug members 62a, 62b and 62c. The mounting of one of the lug members 62a is shown in FIGS. 4 and 5, and the mounting of the other members is similar.

The lug member 62a is slidably supported on a track 64. The track is in the form of a flat plate underlying the support member 40 and is provided with a slot 66a through which downwardly depending pin 68a projects and is slidable therein. The lug member 62a is detented by means of a resiliently mounted detent rack 70a having a series of grooves 72a formed therein. The rack 70a is normally biased into contact with the lug member 62a by means of a pair of biasing springs 74a which normally urge the rack 70a against the lug member 62a. Thus, the rack 70a and grooves 72a will tend to resist the movement of the lug member 62a. However, when a force acting in the direction of the slot 66a on lug member 62a is great enough to overcome the bias of the springs 74a, the lug member 62a will move in the track incrementally into the positions defined by the location of the grooves 72a in the rack 70a.

The lug members 62a, 62b and 62c are so positioned on the support member 40 that they will register with the upwardly extending fingers 34a, 34b and 34c on the actuating rods 30a, 30b and 30c of the pump 10 when the field board is inserted into the gasoline pump, and as the field board is advanced, but the slide members are restricted by such contact with the fingers 34, the lug members will stop and relative movement will take place to move the members 62 to positions corresponding to the numbers on the wheels 16a, 16b and 16c in the gasoline pump in a manner which will be more fully described presently.

The data which is stored in the date receiving and storing mechanism 60, together with the information contained on the embossed credit card and station plate, can be recorded and printed on the form 48 by the recording device 12.

RECORDING DEVICE

The recording device 12 includes a frame member 80 having a pair of longitudinally extending guide tracks 82 which are adapted to receive and slidably guide the cams 54 of the field board 14. Depressions 83 in tracks 82 allow for the cams 54 and hence the board 14, to drop into recording position.

The frame member 80 is provided with three slidably mounted actuating bars 84a, 84b and 84c which are mounted (by means not shown) for slidable movement along a rectalinear path. The actuating bars 84a, 84b and 84c have respectively upwardly extending engagement arms 86a, 86b and 86c positioned to be engaged by and coact with the lug members 62a, 62b and 62c in the field board when the field board is inserted therein.

The actuating bars 84a, 84b and 84c are connected to a set of printing wheels 88a, 88b and 88c through a set of gear members 90a, 90b and 90c and operating racks 92a, 92b and 92c. The gear members have gear teeth at opposite ends thereof which engage teeth formed on the actuating bars 84 and the operating racks 92. The operating racks 92 engage the printing wheels 88 through peripheral teeth (not shown). Coiled torsion springs 96a, 96b and 96c are provided around the gear members 90a, 90b and 90c respectively which normally urge the actuating racks to the most extreme positions to the right as viewed in FIG. 1.

The printing wheels 88a, 88b and 88c are positioned to align with the printing wheel opening 50 in the field board when the field board is inserted in the recording device 12. The recording device 12 also includes a clearing dog 98, (shown in detail in FIG. 6) which is pivotally mounted on a shaft 100 and normally urged to its upward position by a spring 102. The spring and shaft and clearing dog are so arranged that the dog is easily movable pivotally in a counterclockwise position from the position shown in FIG. 6, but will be difficult to move in a clockwise direction from this position, and the biasing spring 102 will normally return the clearing dog 98 to this position shown in FIG. 6.

OPERATION

The field board 14 is designed to cooperate with either the recording device 12 fitted in the gasoline pump 10 or with the recording device separate. The operation will first be described in conjunction with the recording device being separate and the readings transferred to the field board in one operation and hence transferred to the recording device in a separate operation.

For this type of operation, the guide rods 36 are pulled out to their extended position as shown in FIG. 1 and locked in place by the fastening means 39. The gasoline pump is utilized to deliver gasoline in the conventional manner, and the price of the purchase will be shown on the indicia wheels 16a, 16b and 16c. When delivery has been completed, the field board is placed on the guide rods 36 and inserted fully into the machine. The slide members 62a, 62b and 62c will come in contact with the engagement fingers 34a, 34b and 34c of actuating rods 30a, 30b and 30c since they are positioned in linear alignment. The inward movement of the field board 14 will force the slide members 62a, 62b and 62c to operate against the bias of the biasing springs 28a, 28b and 28c. The strength of each of the biasing springs 28a, 28b and 28c is so selected that, combined with the friction in the system of which it is a part, it is weaker than the force generated by the biasing springs 74 against the detent racks 70 holding the slide members 62 in place. Because the strength of the springs 28 is weaker, the actuating rods 30 retreat, and the sensing arms 24 move to the right, as seen in FIG. 1, due to the action of the quadrant gears 32. The movement of the sensing levers 24 and actuating rods 30 will continue until the sensing shoe 26 on each of the sensing arms 24 engages a pin 20 on its respective wheel face. The striking of the pin will provide a positive stop force and prevent any further movement of the particular sensing arm 24 and actuating rod 30 associated therewith. Continued movement of the board after this positive surface has been struck will result in the engagement finger 34 of the associated actuating rod 30 forcing relative movement of lug member 62 in its slot 66. The movement of the lug member 62 in the slot 66 will continue to the extent that the field board is moved inwardly, and this linear movement will cease when the field board has been fully inserted. The position of full insertion is shown somewhat schematically in FIG. 7 recording a value registered on the register wheels 16a, 16b and 16c.

As can be seen, each of the lug members 62 has been moved to a different detent position in its slot 66. When the field board 14 is removed from the gasoline pump, there is no force tending to move the lugs, and the racks 70 hold the lug members 62 in this final position. Also, when the field board is removed from the gasoline pump, the springs 28 will move their respective sensing arms 24 and actuating rods 30 back to the home position.

When the field board has been removed from the gasoline pump, the value of the gasoline delivered is stored therein by the linear positions of the lug members 62. These members 62 constitute a mechanism which is programmed to transfer this value to the printing wheels 88 of the recorder 12.

In order to transfer the readings stored in the field board 14 to the recording device 12, the cams 54 are positioned in the guide tracks 82 and the field board slid into the recording device. The cams 54 are adapted to hold the surface of the field board 14 above the level of the printing wheels, and when reaching the fully inserted position, the cams 54 will coact with corresponding depressions 83 to drop the level of the field board so that the printing wheels 88 will extend into the printing wheel opening 50.

Upon the insertion of the field board 14 in the recording device 12, the lug members 62 will first pass over the clearing dog 98. As indicated above, the clearing dog is easily movable pivotally to allow movement in this direction and will not affect the position of the slide members 62.

Upon continued movement of the field board being inserted into the recording device, the lug members 62a, 62b and 62c will strike the respective engagement arms 86a, 86b and 86c of actuating bars 84a, 84b and 84c and cause them to move rearwardly (to the left as seen in FIG. 1) which will in turn cause the gear members 90a, 90b and 90c to rotate the printing wheels 88a, 88b and 88c through the operating racks 92a, 92b and 92c. In this respect, it should be noted that the force in the torsion springs 96a, 96b and 96c, combined with the friction of the system of which it is a part, is less than the force caused by the biasing springs 74a, 74b and 74c on the respective racks 70a, 70b and 70c so that the lug members 62 will not move, but lug members 62 will move the actuating bars 84 and printing wheels 88 instead. The amount of linear movement of the actuating bars 84, and hence the amount of rotation of the printing wheels 88, will be determined by the position of the respective member 62a. If its position is to the extreme left, as shown in FIG. 1, it will cause the maximum rotation of the printing wheel. If it is in any of the intermediate positions, it will cause a lesser rotation of printing wheel, and if it is in the extreme right position, as shown in FIG. 1, it will cause no rotation of the printing wheel. Since the positions of the lug members 62a, 62b and 62c are incremental and detented, the amount of rotation of the printing wheels 88a, 88b and 88c will be correspondingly incremental. Thus, the printing wheels will be rotated to precisely the number which corresponds to the linear position of the lug members, and this number can then be printed onto the form by means of a conventional printing platen designated P in FIG. 1. The position of the mechanism to cause the printing of the stored number 340 is shown in FIG. 8. The information contained on a printing token card contained in the receiving slot 42, and station plate in the station plate receiving slot 44, will also be printed onto the form.

Once the information has been printed, the field board can be removed. The removal of the field board will cause the lug members 62 to pass over the clearing dog 98, which dog will engage the lug members 62. Since, as explained above, it is relatively difficult to move the dog in the clockwise direction, the force of the dogs will return the slide members to their far left position (as shown in FIG. 1), at which point the dog 98 will yield and allow the members 62 to pass thereby. Also, as the field board is removed, the coil springs 96 will return the actuating bars 84 to their home position. Thus, when the information has been recorded from the field board, it is automatically cleared therefrom when the field board is removed, and the recording device 12 returns to its home position ready to accept and record additional data.

With the operation just described, it is apparent that, when the gasoline is delivered, the attendant need merely place the credit card and form in the field board, insert the field board into the gasoline pump to record and store the amount of the gasoline purchase, remove the field board from the gasoline pump and place it into a recording device, actuate the platen and automatically record the total sale, remove the filed board which is then ready for additional use. One central recorder can serve several gasoline pumps, so that each pump need not be provided with its own recording device.

However, there may be situations wherein the amount of usage of a pump may either permanently or temporarily warrant the provision of a recorder for a gasoline pump. For example, during peak periods when maximum usage of personnel is desired, and the pumps are continuously being operated, it may be very desirable to have each pump that is in operation furnished with its own recording device. With the present invention, the recording device can be inserted into the pump and operated concomitantly with the sensing of the data by the field board.

In order to insert the recording device into the pump, fastening means 39 are released and the rods 36 slid back into the pump, allowing the recording device 12 to be inserted into the recess 38. The actuating rods 30, and the actuating bars 84, are so positioned in their respective devices that, when recording device 12 is placed into the recess 38, each of the actuating bars 84a, 84b and 84c is positioned closely adjacent to its respective actuating rod 30 with the ends of the engagement arms 86 being in line with the ends of the engagement fingers 34. The mountings of the actuating bars 84 in the frame member 80 of the recording device includes slots, or openings, (not shown) which are wide enough to accommodate the actuating bars 84 and actuating rods 30 in side-by-side relationship. This position is shown diagrammatically in FIG. 9.

With the recorder so positioned, the delivery of the gasoline is the same as previously described. Once the delivery is completed, the attendant will, as before, place the credit card and form in the field board 14. The field board will then be inserted into the recording device 12. The lug members 62a, being to their full leftward position, as viewed in FIG. 1, will pass over the clearing dog 98, and each slide member 62a, 62b and 62c will engage both of its respective actuating bars 84a, 84b and 84c, and actuating arms 30a, 30b and 30c. Continued movement of the field board into the recorder will cause the actuating bars 84 and actuating rods 30 to move to the left, each pair moving together under the urging of the respective lug member 62. It should be noted that, in order for this movement to take place, the combined strength of each torsion spring 96a, 96b and 96c and friction of the associated system and biasing springs 28a, 28b and 28c, and friction of its associated system, must be less than the force generated by the springs on the corresponding detent rack 70a, 70b and 70c so that the respective slide members 62a, 62b and 62c will cause movement of the actuating bars 84 and the rods 30. The movement of both the bars 84 and rods 30 will continue until the respective sensing shoe 26 of a bar strikes a pin 20 on its respective wheel 16. This will, as previously described, prevent further movement of the actuating rod 30 and will cause the respective lug members 62 to move in its slot. Since, after the shoe strikes the pin, the lug member 62 is not moving in its slot, it will not move the corresponding actuating bar any further, and hence the actuating bar will have set its respective printing wheel 88 at this sensed position, so that when the field board has been fully inserted, the lug members 62a, 62b and 62c will have sensed the reading of the pump through the actuating rods 30a, 30b and 30c and concomitantly transferred this sensed position to the actuating bars 84a, 84b and 84c which in turn set the printing wheels which will then allow printing of the information contained on the printing wheels, as well as that on the credit card and station plate onto the form as previously described. Once this printing operation has taken place, the field board is removed, and it will be cleared by the clearing dog 98 as previously described. Also, the printing wheels will return to their home position, as previously described, and the actuating rods 30 will also return to their home position, as previously described. Thus, in the present invention, the recording device can be used in a position mounted on a gasoline pump so that a single operation of sensing the amount and registering this on the recording device can take place, as well as having a single sensing operation and a separate operation for transferring this sensed data into a recording device.

While the invention has been described in specific detail, it is believed that the invention encompasses a provision of systems and components thereof for generating, storing and recording variable data from a variable data source wherein the variable data source includes means to translate variable data conditions to predetermined measurable conditions of a data input mechanism, a data receiving and storing device having mechanical transfer means to sense and retain as corresponding relative condition thereof the condition of the data input mechanism, and a data recording means having sensing means to sense the condition of the transfer means, and printing means to print characters responsive to the sensed condition in the data receiving and storing device.

In the preferred embodiment, the means to translate the variable data conditions include linearly movable arms 24 and sensing shoes 26 cooperating with the pins 20 and acting through the quadrant gears 32 to set the actuating rods 30 at predetermined linear positions. The means to sense the relative conditions in the data board 14 include the lug members 62 and their mounting in the data board. The means to sense the condition of the retained data in the data board include the actuating bars 84, the gear members 90 and the operating racks 92 in the data recording device.

What is claimed is:

1. An apparatus for use in recording data indicative of the setting of a register assembly, said apparatus comprising indicator means operatively connected with the register assembly for indicating a setting of the register assembly, said indicator means including a base, a plurality of indicator elements connected with said base and movable relative to said base to positions corresponding to a setting of the register assembly, said apparatus further comprising printing means spaced from said indicator means for recording on sheet material data corresponding to a setting of the register assembly, said printing means including a base, a plurality of adjustable printing elements movably connected with said base of said printing means, each of said printing elements including a plurality of characters which are movable between inactive positions and a printing position upon movement of the associated one of said printing elements relative to said base of said printing means, and a plurality of drive means each of which is associated with one of said printing elements for effecting movement of the associated printing elements relative to said base of said printing means, each of said drive means including a drive element which is associated with one of said printing elements and is movable relative to said base of said printing means to effect movement of the associated printing element to a corresponding extent, said apparatus further comprising a data board movable between a sensing position at which said data board is spaced from said recording means and is disposed in operative engagement with said base of said indicator means and a recording position at which said data board is spaced from said indicator means and is disposed in operative engagement with said base of said printing means, first holder means on said data board for holding a printing plate, second holder means on said data board for holding sheet material in a predetermined relationship with said printing elements and a printing plate held by said first holder means when said data board is in the recording position, data transfer means mounted on said data board for receiving and storing data corresponding to a setting of the register assembly when said data board is in the sensing position and for activating at least some of said drive means upon movement of said data board to the recording position to effect movement to their printing positions of characters corresponding to the data stored in said data transfer means, said data transfer means including a plurality of settable actuator means mounted on said data board and movable by said indicator elements to settings corresponding to a setting of the register assembly as the data board is moved from a position spaced from said indicator means to the sensing position, said settable actuator means being engageable with said drive elements as said data board is moved toward the recording position to effect movement of each of said drive elements to extents corresponding to the setting of associated ones of said actuator means during continued movement of said data board toward the recording position, said printing means including means for effecting a transfer of data from said printing elements and a printing plate held by said first holder means to the sheet material held by said second holder means when said data board is in the recording position.

2. An apparatus as set forth in claim 1 wherein each of said actuator means includes an input element mounted on said data board and movable relative thereto along a predetermined path under the influence of said indicator means and means for defining a plurality of settings along said path corresponding to a predetermined one of the characters on the associated one of said printing elements.

3. An apparatus as set forth in claim 1 wherein said actuator means are movable relative to said data board from initial positions to the settings corresponding to a setting of the register assembly by said indicator means upon movement of said data board to the sensing position, said printing means including means for returning said actuator means to their initial positions upon movement of said data board from the recording position.

4. An apparatus as set forth in claim 1 wherein said indicator means includes means supporting said indicator elements for movement relative to said base of said indicator means from initial positions to indicating positions corresponding to settings of the register assembly, said actuator means being engageable with said indicator elements to move said indicator elements from their initial positions to their indicating positions during movement of said data board toward the sensing position.

5. An apparatus as set forth in claim 1 wherein said indicator means includes means supporting said indicator elements for movement from initial positions to indicating positions corresponding to settings of the register assembly and spring means for urging said indicator elements toward their initial positions, said actuator means being engageable with said indicator elements to move said indicator elements from their initial positions to their indicating positions against the urging of said spring means during movement of said data board toward the sensing position, said spring means being effective to return said indicator elements to their initial positions upon movement of said data board from the sensing position.

6. An apparatus for use in recording data indicative of the setting of a register assembly, said apparatus comprising indicator means operatively connected with the register assembly for indicating a setting of the register assembly, recording means spaced from said indicator means for recording data corresponding to a setting of the register assembly, data board means for transferring data indicative of a setting of the register assembly from said indicator means to said recording means, said data board means being movable between a sensing position at which said data board means is spaced from said recording means and is disposed in operative engagement with said indicator means and a recording position at which said data board means is spaced from said indicator means and is disposed in operative engagement with said recording means, said data board means including data transfer means for receiving data corresponding to a setting of the register assembly when said data board means is in the sensing position, for storing data corresponding to the setting of the register assembly during movement of said data board means from the sensing position to the recording position, and for transferring data corresponding to the setting of the register assembly to said recording means when said data board means is in the recording position.

7. An apparatus as set forth in claim 6 wherein said indicator means includes a plurality of indicator elements which are movable from initial positions to positions corresponding to settings of the register assembly, said data transfer means including means for effecting movement of said indicator elements from their initial positions to positions corresponding to a setting of the register assembly upon movement of said data board means to the sensing position.

8. An apparatus as set forth in claim 6 wherein said data transfer means includes a plurality of actuator elements which are movable by said indicator means from initial positions to positions corresponding to settings of the register assembly during movement of said data board means to the sensing position, said recording means including a plurality of movable printing elements and drive means operatively engageable with said actuator elements for moving said printing elements to positions corresponding to the positions of said actuator elements during movement of said data board means to the recording position.

9. An apparatus as set forth in claim 6 wherein said data transfer means includes a plurality of actuator elements which are movable by said indicator means from initial positions to positions corresponding of settings of the register assembly during movement of said data board means to the sensing position, said recording means including a plurality of movable printing elements, drive means operatively engageable with said actuator elements for moving said printing elements to positions corresponding to the positions of said actuator elements during movement of said data board means to the recording position, and means for moving said actuator elements from positions corresponding to a setting of the register assembly to their initial positions during movement of said data board means away from the recording position.

10. An apparatus as set forth in claim 6 wherein said data board means further includes means for holding a printing plate in a predetermined relationship with said recording means when said data board means is in the recording position and means for holding sheet material in a superposed relationship with the printing plate when said data board means is in the recording position to enable data to be transferred from the printing plate to the sheet material when said data board means is in the recording position.

11. An apparatus as set forth in claim 6 wherein said data transfer means includes a plurality of data storage elements movable along predetermined paths to positions corresponding to settings of the register assembly and means for defining a plurality of settings along each of the paths and releasably holding the data storage elements at their settings during movement of said data board means from the sensing position to the recording position.

12. An apparatus for use in recording on sheet material data indicative of the setting of a register assembly, said apparatus comprising indicator means operatively connected with the register assembly for indicating a setting of the register assembly, said indicator means including a base and a plurality of indicator elements movable relative to said base from initial positions to indicating positions corresponding to settings of the register assembly, recording means for recording data corresponding to a setting of the register assembly, said recording means including a base, a plurality of adjustable printing elements connected with said base of said recording means, each of said printing elements including a plurality of characters which are movable between inactive positions and a printing position upon movement of the associated one of said printing elements relative to said base of said recording means, and a plurality of drive means each of which is associated with one of said printing elements for effecting movement of the associated printing element relative to said base of said recording means, data board means for effecting a transfer of data from said indicator means to said recording means, said data board means being movable between an inactive position in which said data board means is spaced from and freely movable relative to both said recording means and said indicator means and a data transfer position in which said data board means is disposed in operative engagement with said indicator means, said data board means including data transfer means for moving said indicator elements from their initial positions to their indicating positions corresponding to a setting of the register assembly during movement of said data board means toward the data transfer position for activating at least some of said drive means to effect movement to their printing positions of characters corresponding to a setting of the register assembly, said data board means further including first holder means for holding a printing plate, and second holder means for holding sheet material in a predetermined relationship with the printing plate and said printing elements in said recording means, said recording means including means for effecting a transfer of data from said printing elements and printing plate to sheet material held by said second holder means.

13. An apparatus as set forth in claim 12 wherein said data transfer means includes a plurality of settable data transfer elements which are movable by said indicator elements to settings corresponding to a setting of the register assembly during movement of said data board means to the data transfer position, said settable data transfer elements being engageable with said indicator elements to move said indicator elements from their initial positions to their indicating positions, said settable data transfer elements also being engageable with said drive means during movement of said data board means to the data transfer position to effect operation of said drive means and movement of the associated printing elements simultaneously with movement of said indicator elements to their indicating positions.

14. An apparatus as set forth in claim 12 wherein said data board means is movable between the data transfer data transfer position in which data board means is disposed in operative engagement with said indicator means and a second data transfer position in which said data board means is disposed in operative engagement with said recording means and is spaced from said indicator means.

15. An apparatus as set forth in claim 14 wherein each of said drive means includes a rack gear mounted for reciprocating movement relative to said base of said recording means and a pinion gear operatively connected with one of said printing elements, said data transfer means being engageable with said rack gears to effect movement of said printing elements upon movement of said data board means to the second data transfer positions.

16. An apparatus as set forth in claim 12 wherein said indicator means further includes spring means for moving said indicator elements from their indicating positions toward their initial positions upon movement of said data board means from the data transfer position toward the inactive positions.

* * * * *